Jan. 28, 1936.  H. V. REED  2,028,951
CLUTCH PLATE
Filed Dec. 15, 1931   2 Sheets-Sheet 1
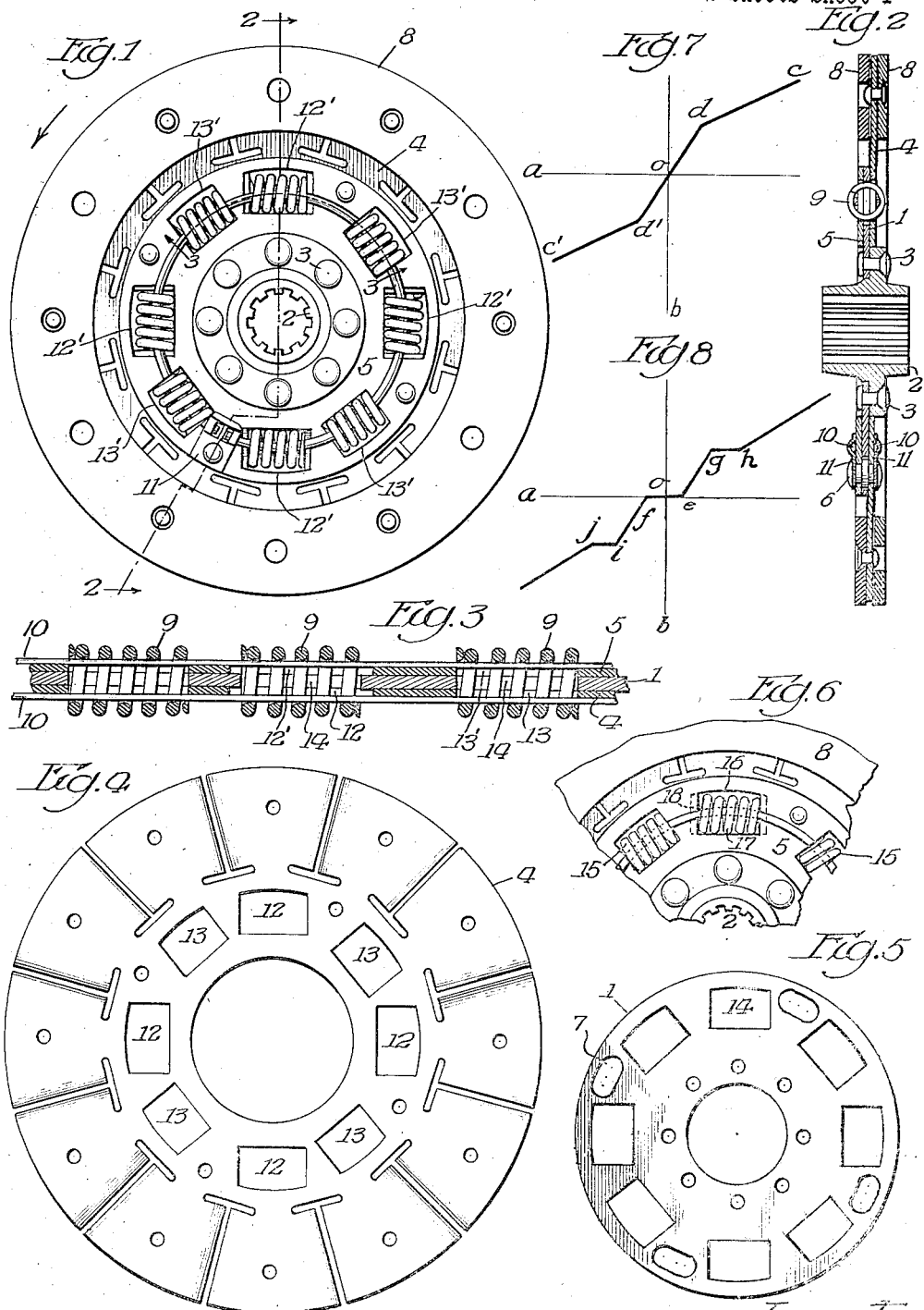
Inventor
Harold V. Reed
By Wm. O. Belt
Atty.

Jan. 28, 1936.                H. V. REED                2,028,951
                             CLUTCH PLATE
                         Filed Dec. 15, 1931            2 Sheets-Sheet 2
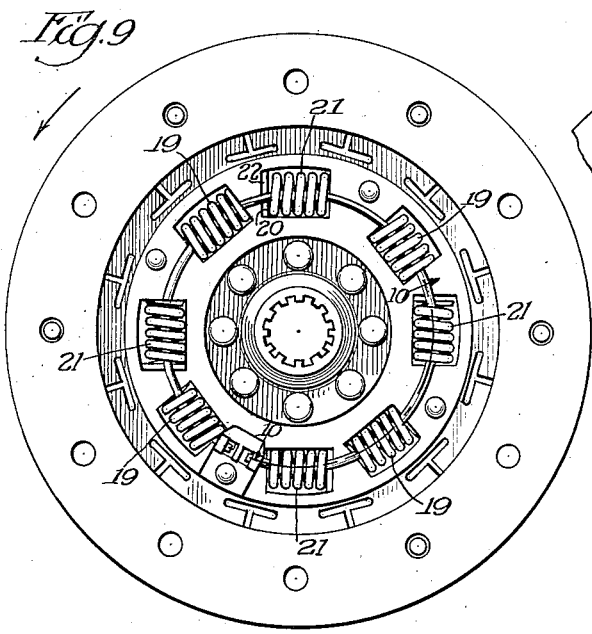
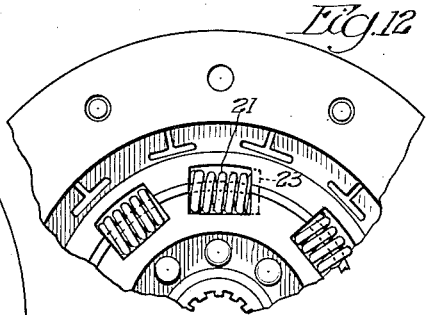
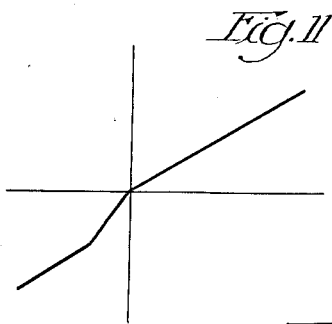
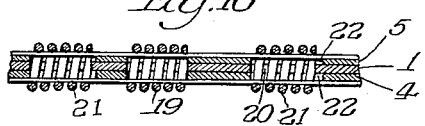
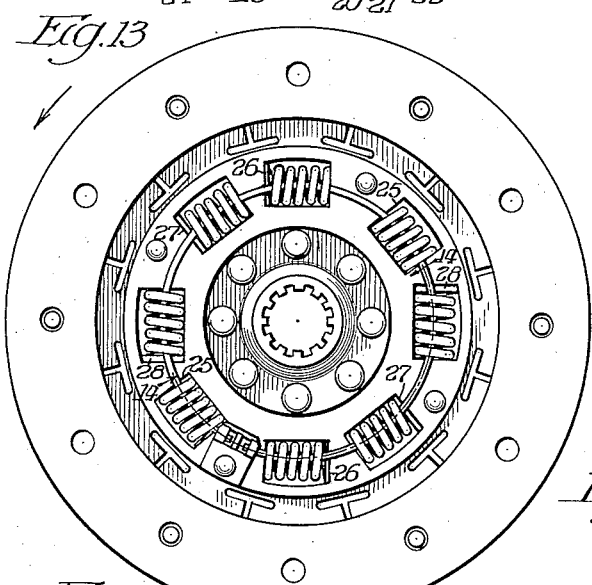
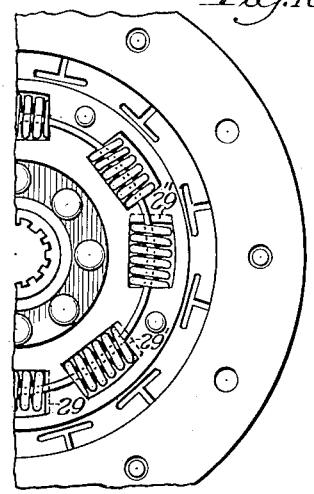
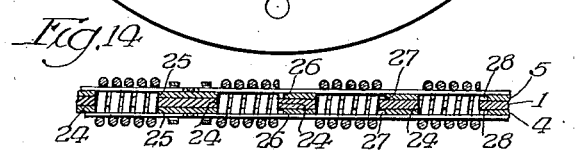
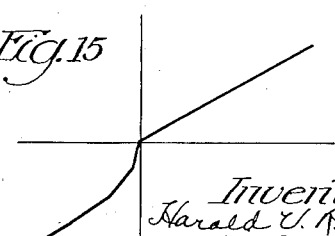
Inventor:-
Harold V. Reed
By M. O. Bell, Atty.

Patented Jan. 28, 1936

2,028,951

UNITED STATES PATENT OFFICE 2,028,951

CLUTCH PLATE

Harold V. Reed, Chicago, Ill., assignor, by mesne assignments, to Borg-Warner Corporation, Chicago, Ill., a corporation of Illinois Application December 15, 1931, Serial No. 581,179

10 Claims. (Cl. 192—68)

This invention relates to friction clutches for automotive vehicles but it may also be used in other friction clutches for which it is or may be adapted.

The primary objects of the invention are to provide a novel clutch plate which will enable the clutch to take hold easily and smoothly without shock or jar and which will dampen those vibrations which have been transmitted heretofore through the clutch.

Clutches have been made heretofore with a clutch or driven plate having a cushion made up of a plurality of springs but these springs have all been brought into action simultaneously in either direction of the torque and for that reason the cushion has not always been efficient in dampening vibrations as required in modern automotive vehicles. For example, there may be a period of vibration in a vehicle at low speed which will require a light cushion to dampen it and the same vehicle may have a period of vibration at a higher speed which will require a heavy cushion to dampen it but the vehicle may have a period of vibration when the engine is driving which will require a heavy cushion to dampen it and the same vehicle may have a period of vibration when the engine is braking which will require a light cushion to dampen it.

Another object of the invention is to provide a clutch plate with a cushion which is caused to act in stages both in driving and braking operations to dampen vibrations under all conditions of operation of the clutch.

And a further object is to separate the stages of action of the cushion means and thereby dampen a greater variety of vibrations than has been possible heretofore.

In the accompanying drawings I have illustrated several embodiments of the invention and referring thereto Fig. 1 is an elevation of a clutch plate having four springs for first-stage engagement and four springs for second-stage engagement when the engine is driving and when it is braking.

Fig. 2 is a sectional view on the line 2—2 of Fig. 1.

Fig. 3 is an enlarged detail sectional view on the line 3—3 of Fig. 1.

Fig. 4 is an elevation of the friction member and Fig. 5 is an elevation of the side plate of the hub member shown in Fig. 1.

Fig. 6 is a fragmentary view showing a modification of the invention as shown in Fig. 1.

Fig. 7 is a chart showing the characteristics of the deflection curves of the clutch plate shown in Fig. 1 when the springs fit snugly but not under compression between the end walls of the openings in the hub member.

Fig. 8 is a similar chart when the springs are arranged normally under slight compression in the openings in the hub member.

Fig. 9 is an elevation of a clutch plate in which the springs have one-stage engagement for one operation and multi-stage engagement for the other operation.

Fig. 10 is an enlarged detail sectional view on the line 10—10 of Fig. 9.

Fig. 11 is a chart showing the characteristics of the deflection curves of the clutch plate shown in Fig. 9.

Fig. 12 is a fragmentary view showing a modified form of the clutch plate of Fig. 9.

Fig. 13 is an elevation of a clutch plate with eight springs arranged in pairs for multi-stage engagement.

Fig. 14 is an enlarged detail sectional view on the line 14—14 of Fig. 13.

Fig. 15 is a chart showing the characteristics of the deflection curves of the clutch plate shown in Fig. 13, and Fig. 16 is a fragmentary view showing a modified form of the clutch plate shown in Fig. 13.

Referring to Figs. 1-8 the clutch or driven plate comprises a hub member 1, Fig. 5, which is rigidly secured to the hub 2 by rivets 3, Figs. 1-2; a friction member 4; and a cover ring 5. The friction member and the cover ring are arranged on opposite sides of the hub member and they are rigidly connected together by rivets 6 which pass through elongated openings 7 in the hub member whereby the friction member and the cover ring are capable of limited conjoint rotative movement relative to the hub member. Facing rings 8 of suitable friction material are secured on opposite sides of the friction member, but loose or sectional rings may be used if preferred. A plurality of coil springs 9 are arranged in pockets formed by openings in the hub member, the friction member, and the cover ring, and they may be retained in place in any suitable manner as, for example, by wires 10, the ends of the wires being secured in place by suitable clamp devices 11. I have shown and described these parts in a preferred form but the invention is not limited thereto and they may be made in various forms without departing from the invention.

Instead of making the spring openings in the hub member and the friction member and the cover ring of the same length, in which case the springs would all act equally and simultaneously, I make some of the openings in one member longer than others and all of the openings in the other member uniform and of shorter length. The cover ring is considered a part of the friction member, being rigidly secured thereto, and the openings therein will be uniform with the openings in the friction member.

In the form shown in Figs. 1–5 the openings 12 in the friction member, Fig. 4, and the openings 12' in the cover ring, Fig. 1, are of uniform length and are longer than the openings 13 in the friction member, Fig. 4, and the openings 13' in the cover ring, Fig. 1, which are also of uniform length. All the openings 14 in the hub member, Fig. 5, are of uniform length and correspond in length with the openings 13 in the friction member and 13' in the cover ring. When movement is applied initially to the friction member and the cover ring they will move relatively to the hub member and since the openings 13, 13' in the friction member and the cover ring are of the same length as the openings 14 in the hub member the springs in these openings will immediately start compressing; but the openings 12, 12' of the friction member and the cover ring are longer than the openings 14 in the hub member and hence the springs in these openings will not start compressing until the friction member and the cover ring have moved relatively to the hub member sufficiently to engage the ends of these springs between the walls at one end of the openings 12, 12' and the walls at the opposite end of the openings 14 whereupon all of the springs will be compressing. Thus the springs are brought into action in stages and the cushion effect of the clutch or driven plate is correspondingly staged to enable it to dampen vibrations under different conditions of operation.

In Fig. 6 the openings forming the pockets for the springs 15 are all of the same length and the openings 16 in the friction member and the cover ring for the springs 17 are also of uniform length and of the same length as the openings for the springs 15, but the openings 18 in the hub member for the springs 17 are longer than the openings 16. The difference between the construction of Fig. 6 and the construction of Fig. 1 is that in Fig. 1 the longer openings 12, 12' are located in the friction member and cover ring, whereas in Fig. 6 the longer openings 18 are located in the hub member, but the action of the clutch plate of Fig. 6 is exactly the same as that of the clutch plate of Fig. 1.

Fig. 7 shows the deflection curves of the clutch plate of Figs. 1–5 when the springs fit snugly but not under compression between the end walls of the openings in the hub member, *a* being the load line, *b* being the deflection line, and *o* indicating zero. The line *o, c* shows the characteristics of the deflection curve of the clutch plate when the engine is driving and the line *o, c'* shows the characteristics when the engine is braking; *o, d* and *o,-d'* indicate first stage compression of the springs in the openings 13, 13', and *d, c* and *d', c'* indicate compression of all the springs. The chart of Fig. 8 shows the characteristics of the deflection curves of the clutch plate as shown in the chart of Fig. 7 except that it indicates in the lines *o, e* and *o, f* and *g, h* and *i, j* that the springs are inserted under initial compression and represent an initial load which correspondingly interrupts the progressive action of the cushion.

In the construction of Figs. 9 and 10 the openings forming the pockets for the springs 19 are of uniform length and the openings 20 in the hub member 1 for the other springs 21 are of the same length as the openings for the springs 19, but the openings 22 in the friction member 4 and cover ring 5 for the springs 21 are elongated on the left side of their center lines, Fig. 9. In this construction the springs 19 will start to compress in the first stage of the movement of the friction member and cover ring relative to the hub member and then the springs 21 will start to compress in the second stage of the movement. The chart, Fig. 11, illustrates the characteristics of the deflection curves of the clutch plates shown in Figs. 9 and 12. The construction of Fig. 12 differs from the construction of Fig. 9 in that the longer openings 23 for the springs 21 are located in the hub member instead of in the friction member and cover ring and are elongated on the right side of the center line instead of on the left side as in Fig. 9.

In Figs. 13 and 14 the openings 24 in the hub member are all of the same length but the openings in the friction member and the cover ring are oppositely paired, the pair 25 being of the same length as the opinings 24, the pair 26 being slightly longer, and the pairs 27 and 28 progressively increasing in length. The chart of Fig. 15 shows the characteristics of the deflection curves of the clutch plates shown in Figs. 13 and 16. The construction of Fig. 16 differs from the construction of Fig. 13 in that the pairs of openings 29, 29', and 29'' which increase in length progressively are located in the hub member instead of in the friction member and cover ring as in Fig. 13.

The invention is capable of embodiment in a variety of forms to bring the cushion springs into action in stages to vary the resistance of the springs to deflection. The forms shown in Figs. 1–12 inclusive show a two-stage development of the cushion effect, and the forms shown in Figs. 13–16 show a four-stage development. Forms for other stages will be suggested by those illustrated and described. It is desirable that the springs be arranged to operate in symmetrically disposed pairs to obtain the desired balance but, instead of having the springs come into action in successive groups or pairs, provision may be made for bringing them into action in succession or individually. The multi-stage development of the cushion effect provided by the invention enables the clutch plate to dampen vibrations at corresponding multi-stage periods and within reasonable ranges, when the engine is driving and when the engine is braking, and the separation of the stages by pauses enables the cushion to dampen vibrations which would otherwise pass through the clutch and thus the capability of a clutch plate for dampening vibrations is materially increased.

The invention may be adapted for clutches of many different forms for many different purposes and I do not limit it to the forms herein shown and described but reserve the right to use it in any form and for any purpose for which it is or may be adapted within the scope of the following claims.

I claim:

1. A clutch plate for friction clutches comprising a driving member and a driven member, said members having a plurality of pockets formed by opposed openings in the members, and springs arranged in said pockets to engage the end walls of said openings, said pockets being arranged in symmetrically disposed groups and the openings in one member being progressively longer than the openings in the other member for successive pairs of pockets to cause the springs in said pockets to act in stages during movement of one member relative to the other member.

2. A clutch plate for friction clutches comprising a driving member and a driven member, said members having a plurality of pockets formed by opposed openings in the members, springs arranged in said pockets to engage the end walls of said openings, and a plurality of pockets having openings in one member progressively longer than the opposed openings in the other member to cause the springs in said pockets to act in stages during movement of one member relative to the other member.

3. A clutch plate for friction clutches comprising a driving member and a driven member adapted to move relative to each other, a sectional cushion interposed between said members, said cushion having both ends of all of the sections thereof engaged with one of said members and having both ends of each of selected sections thereof normally out of engagement with the other of said members and adapted to be engaged upon relative movement of said members.

4. A clutch plate for friction clutches comprising a driving member and a driven member, said members having opposed openings forming spring pockets, and springs arranged in said pockets and having their ends engaged with the end walls of all of the openings in one of said members, at least one of said springs having the ends thereof spaced from the end walls of an opening in the other member and the other springs having their ends engaged with the end walls of all the other openings in said other member, whereby said springs act in stages.

5. A clutch plate for friction clutches comprising a driving member and a driven member adapted to move relative to each other, a sectional cushion interposed between said members, said cushion having the ends of all of the sections engaged with one of said members, at least one of said sections having the ends thereof out of engagement with the other member and the ends of all of the other sections engaged with said other member, whereby said sections act in stages.

6. A clutch plate for friction clutches comprising a driving member and a driven member, said members having opposed openings forming spring pockets, and springs arranged in said pockets and having their ends engaged with the end walls of all of the openings in one of said members and selected of said springs having their ends engaged with the end walls of some of the openings in the other member and each of the other of said springs normally having both of its ends out of engagement with the end walls of the other openings in said other member to act in stages.

7. A clutch plate for friction clutches comprising a driving member and a driven member, said members having opposed openings forming spring pockets, and springs arranged in said pockets and having their ends engaged with the end walls of all of the openings in one of said members and engaged with some end walls of some of the openings in the other member and variedly spaced from the other end walls of said openings in said other member to act progressively in stages.

8. A clutch plate for friction clutches comprising a driving member and a driven member, said members having opposed openings forming spring pockets, and springs arranged in said pockets and adapted to engage the end walls of said openings, both ends of each of selected openings in one member normally extending beyond and overlapping the adjacent ends of each of the openings in the other member opposed to said selected openings whereby the springs in said pockets act in stages during movement of one member in either direction relative to the other member.

9. A clutch plate for friction clutches comprising a driving member and a driven member, said members having a plurality of pockets formed by opposed openings in the members, said pockets being arranged in symmetrically disposed groups, and springs arranged in said pockets and adapted to engage the end walls of said openings, both ends of each of selected openings in one member normally extending beyond and overlapping the adjacent ends of each of the openings in the other member opposed to said selected openings whereby the springs in said pockets act in stages during movement of one member in either direction relative to the other member.

10. A clutch plate for friction clutches comprising a driving member and a driven member, said members having a plurality of pockets formed by opposed openings in the members, and springs arranged in said pockets and adapted to engage the end walls of said openings, selected pockets normally having the openings in one member in registration with the openings in the other member and the other pockets normally having the openings in said one member extending beyond and overlapping the openings in said other member at both ends thereof so that the springs will act in stages during movement of one of said members in either direction relative to the other of said members.

HAROLD V. REED.